United States Patent [19]
Shindo

[11] Patent Number: 5,857,157
[45] Date of Patent: Jan. 5, 1999

[54] PORTABLE COMMUNICATION TERMINAL APPARATUS

[75] Inventor: Koji Shindo, Kanagawa, Japan

[73] Assignee: Sony Corporation, Tokyo, Japan

[21] Appl. No.: 660,153

[22] Filed: Jun. 3, 1996

[30] Foreign Application Priority Data

Jun. 6, 1995 [JP] Japan .................................. 7-139523

[51] Int. Cl.⁶ ............................................ H04B 1/02
[52] U.S. Cl. ......................... 455/550; 455/90; 455/556; 455/566
[58] Field of Search .................... 455/90, 368, 550, 455/556, 557, 558, 566, 564, 575; 379/428, 433, 447, 368; 345/168, 169, 173

[56] References Cited

U.S. PATENT DOCUMENTS

| | | | |
|---|---|---|---|
| 5,140,632 | 8/1992 | Anten ........................................ | 455/557 |
| 5,303,291 | 4/1994 | Tagaki et al. ............................. | 379/433 |
| 5,559,863 | 9/1996 | Hashimoto ................................ | 455/90 |
| 5,584,054 | 12/1996 | Tyneski et al. ............................ | 455/90 |
| 5,715,524 | 2/1998 | Jambhekar et al. ....................... | 455/90 |

*Primary Examiner*—Wellington Chin
*Assistant Examiner*—Thuan T. Nguyen
*Attorney, Agent, or Firm*—Jay H. Maioli

[57] ABSTRACT

A portable communication terminal apparatus according to the present invention includes a first means having a microphone and a speaker, and a second means having operation keys and/or display means. At least one of the first and second means has a magnet for attaching the second means to the first means. The second means can be attached to the first means. Each of the first means and the second means has a light emitter and a light detector, whereby data is transmitted therebetween. The operation keys are provided on one surface of the second means. When the second means is attached to the first means with the one surface thereof being faced forward, data is transmitted between the light emitter of the first means corresponding to the light detector of the second means and the light emitter of the second means corresponding to the light detector of the first means. The second means has a memory means for storing identification information of a user.

12 Claims, 7 Drawing Sheets

PORTABLE COMMUNICATION TERMINAL APPARATUS

BACKGROUND OF THE INVENTION

1. Field of the Invention

The present invention relates to a portable communication terminal apparatus suitable for use in a handset of a radio telephone apparatus and so on.

2. Description of the Related Art

Various proposed casings of the portable communication terminal apparatus such as a radio telephone apparatus, a portable telephone apparatus or the like are arranged so as to be convenient in portability.

FIG. 1 is a perspective view showing a portable telephone apparatus which is not being used for communication. FIG. 2 is a perspective view showing the portable telephone apparatus which is being used for communication.

In FIGS. 1 and 2, a portable telephone set 1 is formed of a body casing 2 and a card casing (sub casing) 3.

The body casing 2 has a shape of a substantially rectangular parallelepiped. As shown in FIG. 2, the body casing 2 has a step portion 4 and a thickness that is lower-side portion of the body casing 2 is smaller as compared with that of an upper-side portion 2a thereof. A panel 5 having an operation key group 6 for telephone such as a ten key or the like is provided on a front surface of the lower-side portion 2b. A hook switch 7 is provided on the panel 5.

The upper-side portion 2a of the body casing 2 incorporates a receiver 8 therein. The receiver 8 emanates a dial tone through apertures 9 provided through the body casing 2. A power source key 10 is provided on a front surface of the upper-side portion 2a. An antenna 11 can be inserted in the body casing 2 and is drawn therefrom upon a telephone call as shown in FIG. 2.

The card casing 3 incorporating a transmitter 13 is pivotally fitted to a lower end edge portion of the body casing 2 by a hinge portion 12. The surface of the card casing 3 merely functions as a cover in a state that the card casing 3 is rotated around the hinge portion 12 and closed so as to be opposed to the panel 5 of the body casing 2 as shown in FIG. 1. On the other hand, in a state that the card casing 3 is rotated around the hinge portion 12 and opened as shown in FIG. 2, a user can make a telephone call by speaking toward the transmitter 13 through apertures 14 formed through a transmitter-side surface of the card casing 3.

According to the portable telephone apparatus having the above arrangement, it is possible to make the portable telephone apparatus compact when the user carries it, and it is possible to realize the arrangement which provides convenience in portability. However, since the portable telephone apparatus is used upon a telephone call with the card casing 3 being rotated around the hinge portion 12 and opened as shown in FIG. 2, the card casing 3 is not stable and is easily broken. Since the user puts the portable telephone apparatus to his ear, the user cannot watch the display unit and operate an operation unit. These disadvantages lead to inconvenience in use thereof.

Moreover, there is then the problem that when the user makes a telephone call, the body casing 2 and the opened card casing 3 occupy a considerable space or area and hence the whole of the portable telephone apparatus becomes large-sized.

Since various systems of the portable telephone apparatus have been proposed, if a user carries a certain kind of a portable radio telephone terminal and goes out of a predetermined service area thereof, it is frequently observed that the user cannot use it there. Therefore, there is then the problem that even if the user uses a rental terminal, then he cannot use his own data such as personal telephone numbers or the like at all.

SUMMARY OF THE INVENTION

In view of such aspects, it is an object of the present invention to provide a portable communication terminal apparatus which solves the above problems, and more particularly a portable communication terminal apparatus which, in a used state for a telephone call, communication or the like, allows a user to input a telephone number in a memory and to watch information displayed on a LCD while putting a receiver to his ear, which provides a satisfactory operability with only operation keys required for a telephone call or communication being provided on a card casing, and which has a compact size and prevents the card casing from being unstable during the telephone call or communication.

It is another object of the present invention to obtain a portable communication terminal apparatus which allows a user to utilize his own personal data stored in a suitable means of a card casing even when he goes to a service area of another system of a portable communication terminal apparatus.

According to a first aspect of the present invention, a portable communication terminal apparatus includes a first means having a microphone and a speaker, and a second means having operation keys and/or display means. At least one of the first and second means has a magnet for attaching the second means to the first means. The second means can be attached to the first means. Each of the first means and the second means has a light emitter and a light detector, whereby data is transmitted therebetween. The operation keys are provided on one surface of the second means. When the second means is attached to the first means with the one surface thereof being faced forward, data is transmitted between the light transmitting means of the first means corresponding to the light receiving means of the second means and the light transmitting means of the second means corresponding to the light receiving means of the first means. The second means has a memory means for storing identification information of a user.

According to a second aspect of the present invention, a display means is provided on one surface of the second means and operation keys are provided on the other surface thereof.

According to a third aspect of the present invention, a display means and a space used for attaching thereto an operation card for adding other functions to the second means are provided on one surface of the second means, and operation keys are provided on the other surface thereof.

DESCRIPTION OF THE PREFERRED EMBODIMENTS

Figure 1:
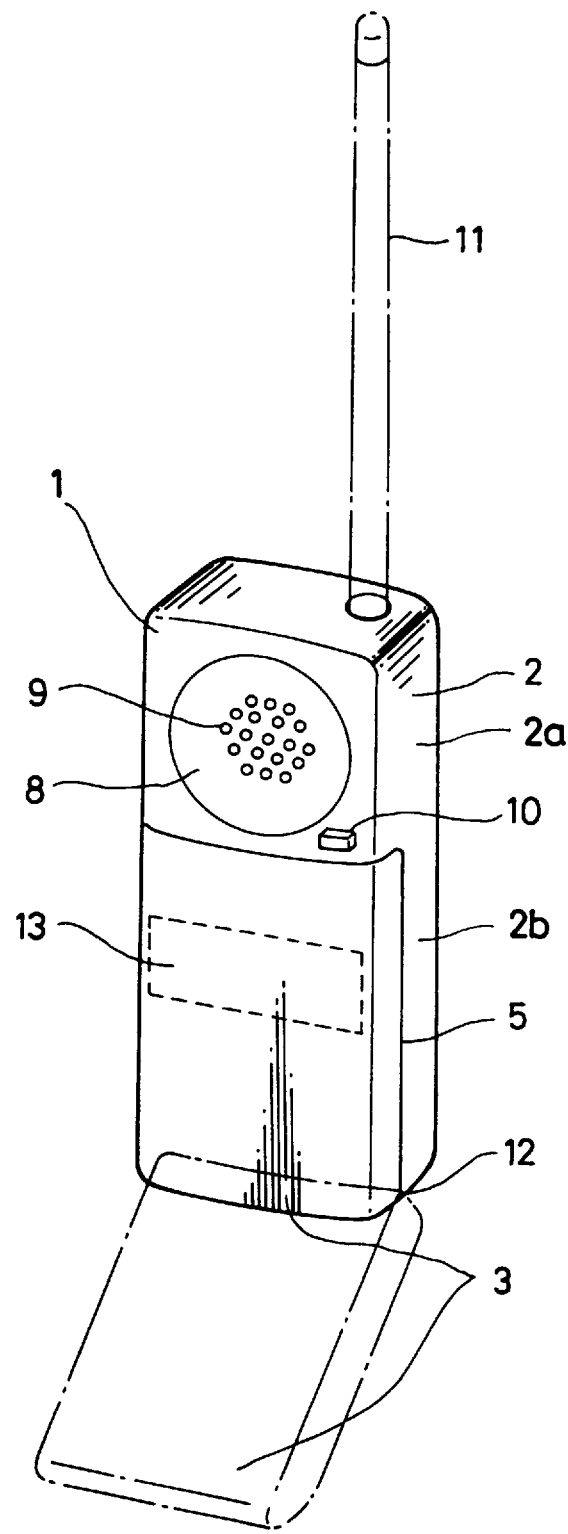
FIG. 1 is a perspective view showing a portable telephone apparatus which is not being used for communication.

A portable telephone set or a portable radio transceiver to which a portable communication terminal apparatus according to the embodiments of the present invention is applied will be described in detail with reference to FIGS. 3 to 10.

Before an arrangement of a casing of the portable radio telephone apparatus according to the first embodiment is described, one example of an electrical circuit arrangement thereof will be described by way of example with reference to FIG. 3. In FIG. 3, parts and elements corresponding to those in FIGS. 1 and 2 are marked with the same reference numerals.

Figure 2:
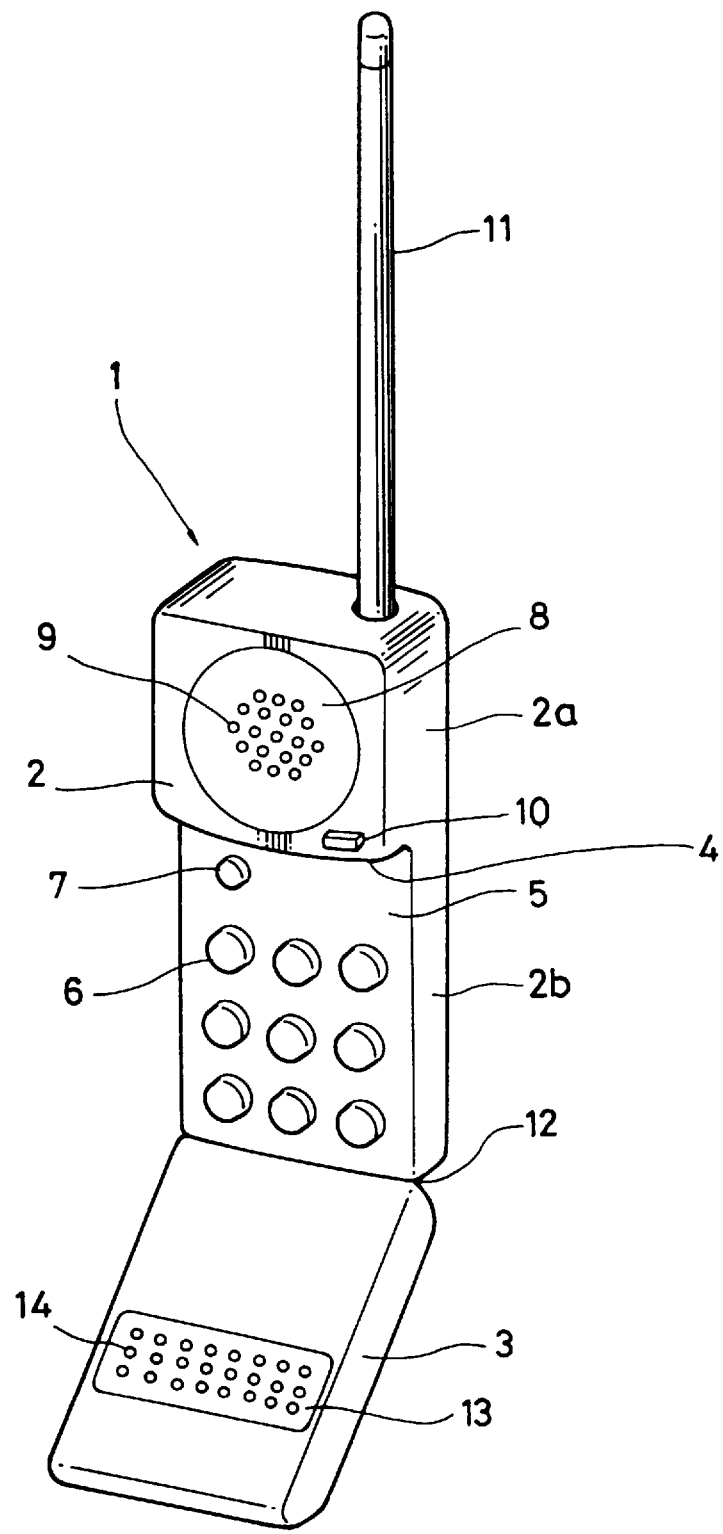
FIG. 2 is a perspective view showing the portable telephone apparatus shown in FIG. 1 which is being used for communication.
Figure 3:
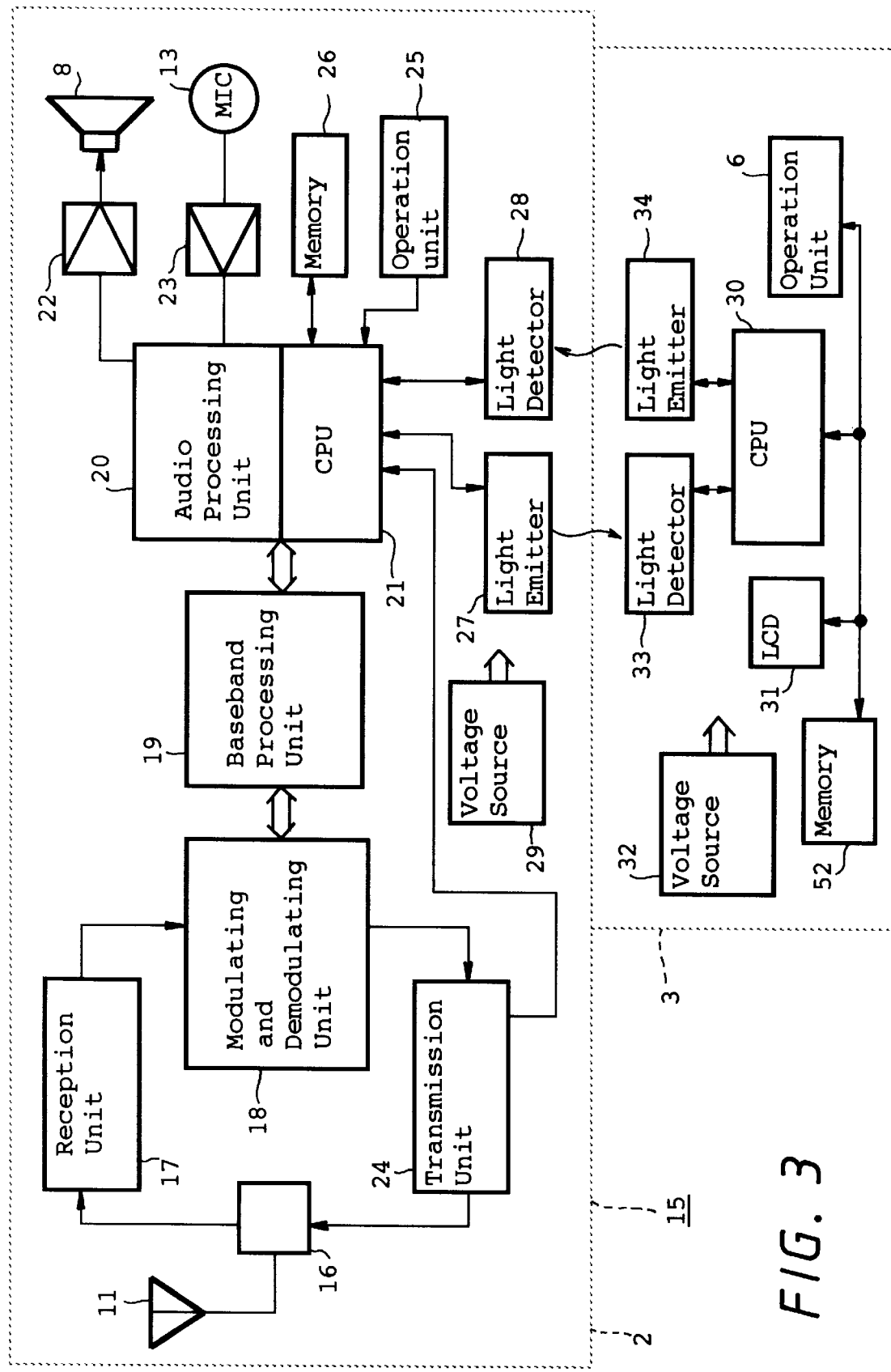
FIG. 3 is a systematic diagram showing an arrangement of a portable communication terminal apparatus according to the present invention.

As shown in FIG. 3, a portable radio telephone apparatus 15 as the portable communication terminal apparatus is formed of a body casing 2 and a card casing 3 similar to the portable telephone set 1 shown in FIGS. 1 and 2. The arrangement of both of the casings 2, 3 will be described later on.

In the body casing 2, a signal received by an antenna 11 is supplied through an antenna coupler 16 to a reception unit 17. The reception unit 16 subjects the received signal to a reception processing for converting the received signal to a signal of a predetermined transmission channel and supplies the processed received signal to a modulating and demodulating unit 18. The modulating and demodulating unit 18 demodulates the received signal to convert the signal to a baseband signal and supplies the demodulated baseband signal to a baseband processing unit 19.

The baseband processing unit 19 extracts an audio signal and control data from the received signal and supplies the extracted audio signal to an audio processing unit 20 and the control data to a control unit (hereinafter referred to as a CPU) 21.

The audio processing unit 20 processes the audio signal extracted from the received signal and supplies the processed audio signal through an amplifier 22 to a receiver 8. The receiver 8 emanates sound in accordance with the audio signal.

The CPU 21 carries out a communication control such as control for setting and switching a communication channel or the like based on the control data supplied from the baseband processing unit 19.

An audio signal output from a transmitter (microphone) 13 is supplied through an amplifier 23 to the audio processing unit 20. The audio processing unit 20 subjects the audio signal to the audio processing for transmission and then supplies the processed audio signal to the baseband processing unit 19. The baseband processing unit 19 subjects the audio signal to the baseband processing to obtain a transmission audio signal, and supplies the transmission audio signal to the modulating and demodulating unit 18. The modulating and demodulating unit 18 carries out modulation processing for transmission. The modulating and demodulating unit 18 supplies the modulated signal to a transmission unit 24. The transmission unit 24 converts the modulated signal into a transmission signal of a predetermined transmission channel, and supplies the transmission signal through the antenna coupler 16 to the antenna 11. The transmission signal is transmitted from the antenna 11 by wireless.

The CPU 21 is connected with an operation unit 25. When a user operates keys forming the operation unit 25, the CPU 21 controls various operations of the portable telephone apparatus based on the user's operation. For example, the operation unit 25 is provided with an operation key group for registration of abbreviated dialing, the setting and so on. The CPU 21 includes a memory 26 formed of a ROM, a RAM and so on for storing communication log data and so on. Moreover, to transmit and receive information signals between the body casing 2 side and the card casing 3 side by wireless (optical communication), a light emitter 27 and a light detector 28 are provided in the body casing 2 to form a first transceiver means. A voltage source 29 such as a primary or secondary battery is incorporated in the body casing 2.

In the card casing 3, a control unit (hereinafter referred to as a CPU) 30 such as a microcomputer or the like is provided. The CPU 30 is connected with an operation unit 6. The operation unit 6 is formed of ten keys for example, or the like and used when a telephone number is input upon a telephone call and a processing for dialing the input telephone number is carried out. A display unit 31 formed of a liquid crystal display (LCD) or the like, a memory 52 for storing a personal identification number (ID) and so on are provided therein.

The CPU 30 is further connected with a light detector 33 for receiving an optical information signal from the light emitter 27 on the body casing 2 side and a light emitter 34 for transmitting an optical information signal to the light detector 28 on the body casing 2 side. Thus, a second transceiver means is formed of the light detector 33 and the light emitter 34, whereby an optical communication (or a wire communication) is carried out between the CPUs 21 and 30. A voltage source 32 such as a primary or secondary battery can be housed in the card casing 3.

The radio telephone apparatus as the portable communication terminal apparatus according to the first embodiment will be described with reference to FIGS. 4 to 7. FIGS. 4 to 7 are perspective views showing how to operate the card casing according to this embodiment.

In FIGS. 4 to 7, the body casing 2 of the portable communication terminal apparatus 15 is made of synthetic resin or the like and has a shape of a substantially flat, rectangular box. Upper and lower end portions of the portable communication terminal apparatus 15 are respectively formed as semicircular portions 50U and 50L. The receiver 8 and the transmitter 13 are respectively provided in the upper and lower semicircular portions 50U and 50L. Respective apertures 9 and 14 formed through arch-shaped plane portions of the upper and lower semicircular portions 50U and 50L are apertures used when the receiver 8 emanates sounds and the transmitter 13 picks up sounds.

Figure 4:
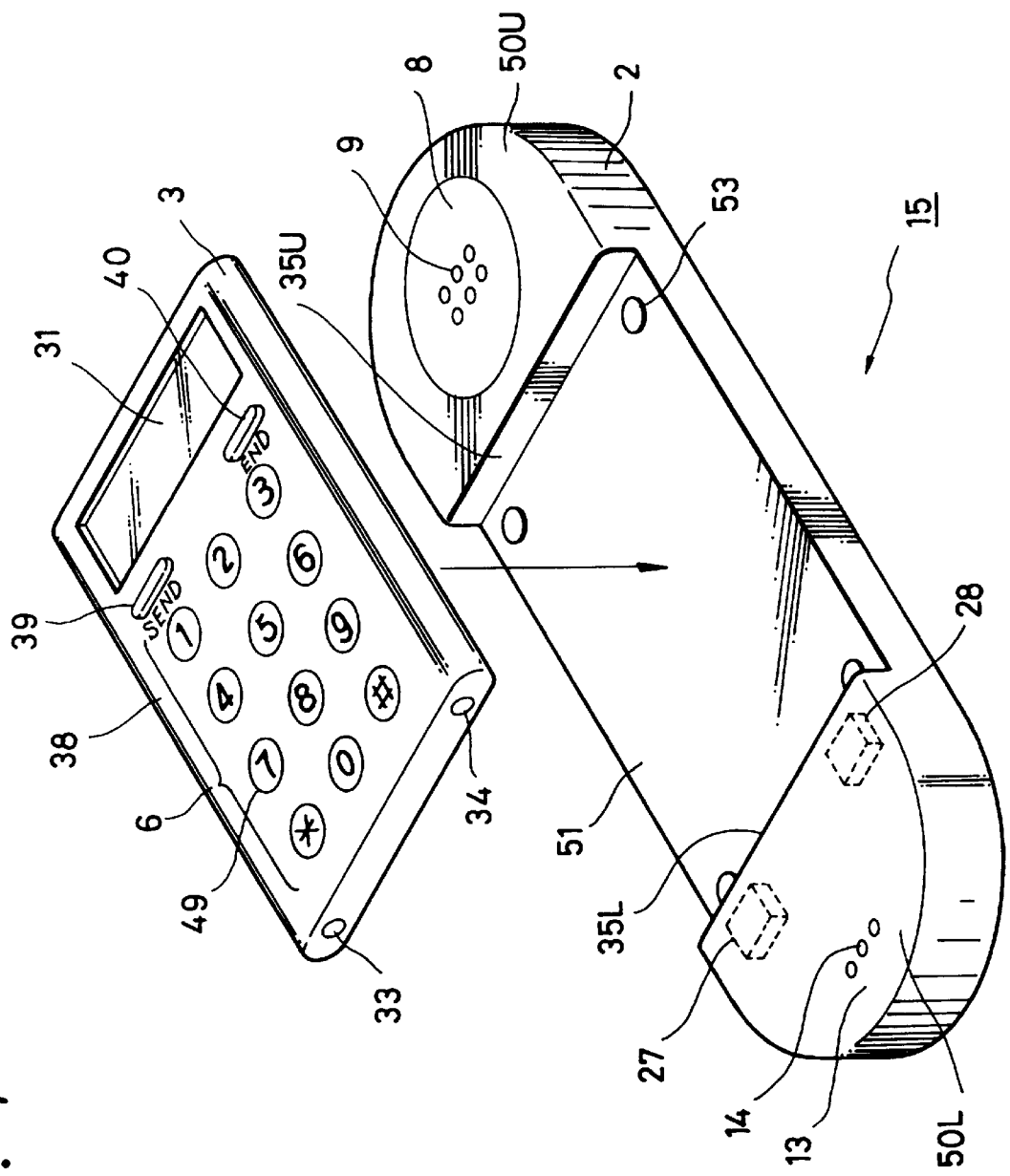
FIG. 4 is a perspective view showing a portable telephone apparatus according to a first embodiment of the present invention, used to explain how to attach and detach a card casing thereof to and from a body casing thereof.

As shown in FIG. 4, the body casing 2 has a groove portion formed at a portion other than the upper and lower semicircular portions 50U and 50L thereof, the groove portion having a concave cross-section in the longitudinal direction of the body casing 2 and having a rectangular bottom plane which is lower than the upper and lower semicircular portions 50U and 50L. The groove portion is formed as a panel 51 to which the card casing 3 described later on is detachably attached. Circular magnets 53 are buried at the four corners, for example, of the panel 51 so as to attract iron pieces (not shown) bonded to corresponding positions on a rear surface of the card casing 3.

The light emitter 27 and the light detector 28 are respectively buried at left and right ends of a lower step portion 35L of the lower semicircular portion 50L of the body casing 2.

An arrangement of the card casing 3 will be described. The card casing (or a card) 3 is made of synthetic resin or the like and has a shape of a substantially rectangular and flat box. The card casing 3 can be applied to a portion between the upper and lower step portions 35U and 35L with being opposed to the panel 51 formed between the upper and lower step portions 35U and 35L on the body casing 2. Thus, the portable communication terminal apparatus is made thin so that the user can carry it in his pocket or the like.

The card casing 3 includes the CPU 30, the operation unit 6, the display unit (hereinafter referred to as a LCD) 31, the memory 52 storing the ID and so on and the light detector 33 and the light emitter 34 forming the second transceiver means which are described with reference to FIG. 3.

Figure 6:
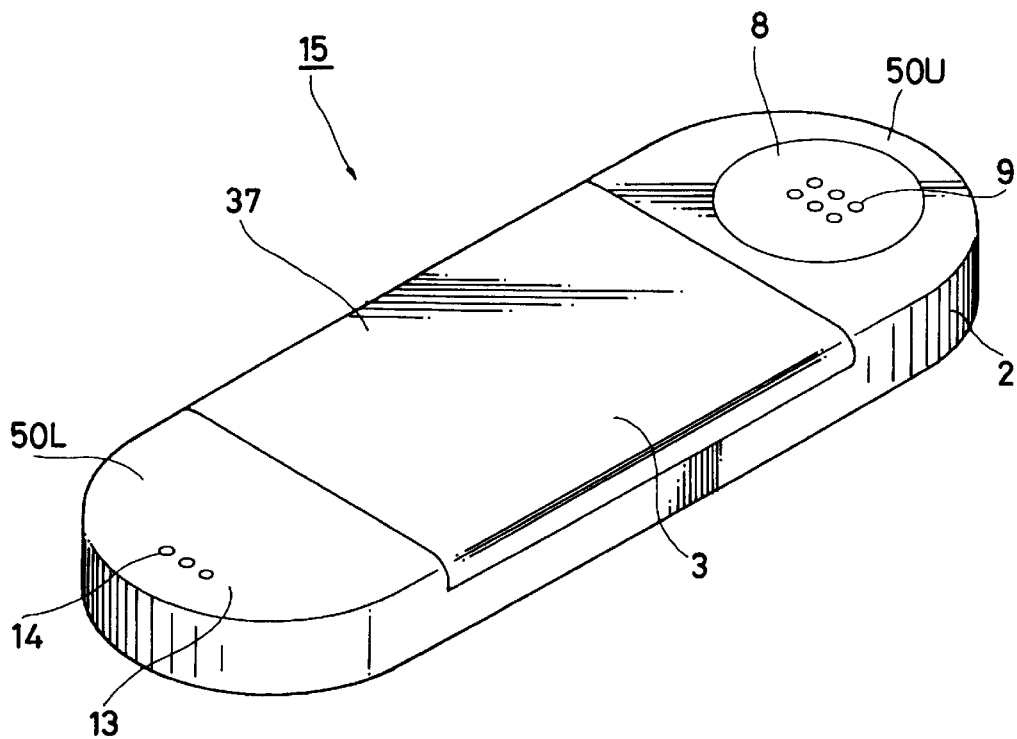
FIG. 6 is a perspective view of the portable telephone apparatus according to the first embodiment which is not being used for communication.

The front surface of the card casing 3 is used as a cover portion 37 as shown in FIG. 6. The cover portion 37 functions to protect the key group in the operation unit 25 formed on the panel 51 of the body casing 2, the LCD 31 provided on a rear side of the card casing 3, and so on which will be described later in detail. Since the cover portion 37 prevents the key group from being exposed even when the user does not use the portable communication terminal apparatus 15, i.e., carries it in a bag, a pocket or the like, it is possible to prevent the portable communication terminal apparatus 15 from being operated by mistake.

Figure 5:
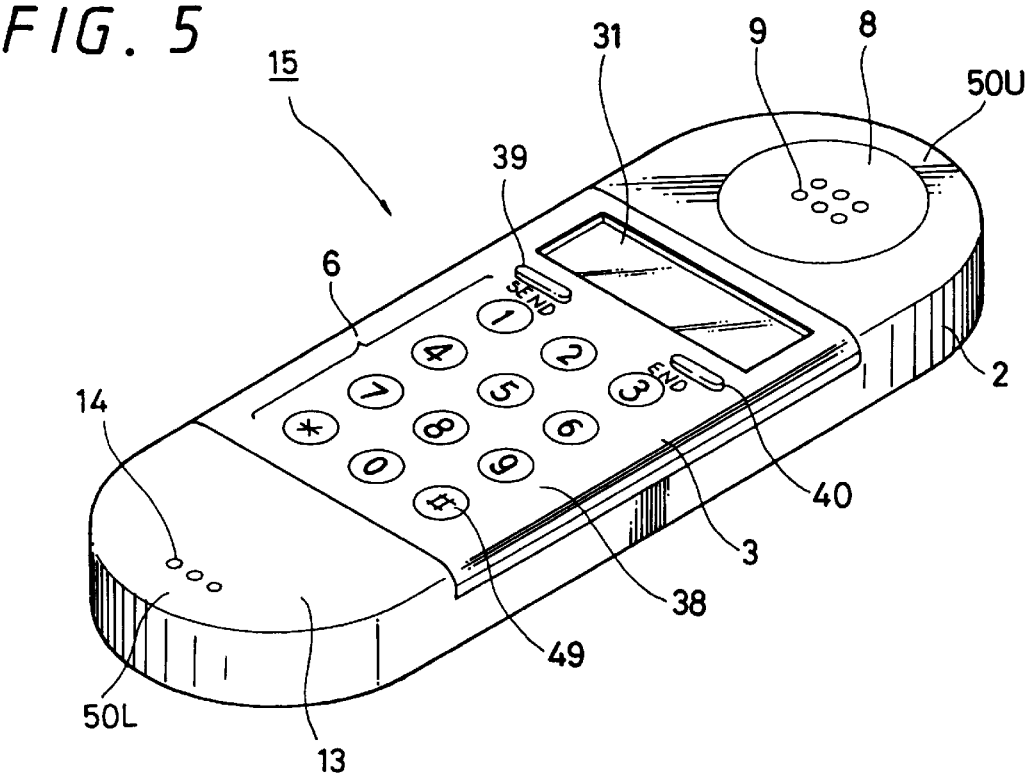
FIG. 5 is a perspective view of the portable telephone apparatus with its card casing being housed therein according to the first embodiment.

The operation unit 6 formed of the LCD 31 and an operation key group such as a ten key 49, a send key 39, an end key 40 or the like is provided on a rear side panel 38 of the card casing 3 as shown in FIGS. 4 and 5.

The light detector 33 is provided at one end portion of the lower side surface of the card casing 3 opposed to the light emitter 27 incorporated in the lower semicircular portion 50L of the body casing 2 as described with reference to FIG. 4. The light emitter 34 is provided at the other end portion of the lower side surface of the card casing 3 opposed to the light detector 28 provided on the body casing 2 side. The antenna 11 is incorporated in the body casing 2.

An operation of the card casing 3 of the portable communication terminal apparatus 15 according to the first embodiment having the above arrangement will be described with reference to FIGS. 4 to 7.

Figure 7:
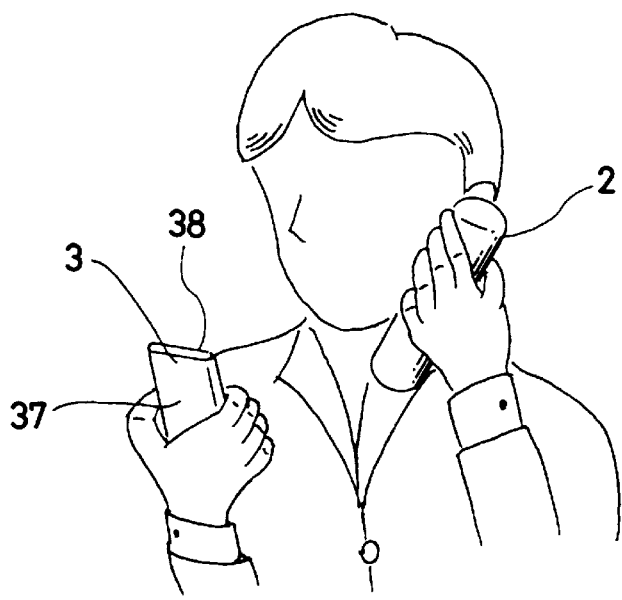
FIG. 7 is a perspective view of the portable telephone apparatus according to the first embodiment which is being used for communication.

FIG. 4 is a perspective view of the portable radio telephone apparatus 15 according to the first embodiment, used to explain how to attach and detach the card casing 3 to and from the body casing 2. When the card casing 3 with its rear side being faced forward is applied to the panel 51, the card casing 3 is brought in its housed state as shown in FIG. 5. Indeed, in this state, the portable radio telephone apparatus 15 can be used for making a telephone call. But, according to the portable communication terminal apparatus 15 according to this embodiment, as shown in FIG. 7, it is possible for the user to make a telephone call while respectively putting the transmitter 13 and receiver 8 to his mouth and ear with the body casing 2 held in his left hand and dialing the telephone number by operating the operation unit 6 such as a ten key or the like provided on the panel 38 with the card casing 3 being held in his right hand, and while watching displayed contents such as various messages, fares or the like displayed on the LCD 31 being used for the telephone call.

Another arrangement of the portable communication terminal apparatus may be employed. In this arrangement, a first operation unit 25, which will be described later on, provided on the body casing 2 side in the first embodiment, i.e., a key group for registration such as an ID code or the like is provided on a cover portion 37 on the front surface of the card casing 3 shown in FIG. 6. The first operation unit 25 is used for registration of the ID or the like. A second operation unit 6 provided on the rear side of the card casing 3 (shown in FIG. 4 or 5) is used for making a telephone call or for communication. In this case, a pair comprising a light emitter and a light detector are provided at each of positions where the light emitter 27 and the light detector 28 are provided in this embodiment.

According to such portable communication terminal apparatus 15 of the first embodiment, since the portable communication terminal apparatus 15 does not occupy a considerable space required when the card casing (sub casing) 3 of the portable telephone set 1 shown in FIG. 2 is hung from a hinge portion of a body casing 2 thereof, a space occupied by both the body casing 2 and the card casing 3 of the portable communication terminal apparatus 15 according to the first embodiment is prevented from being increased unnecessarily. In addition, the portable communication terminal apparatus 15 according to this embodiment is free from breakage and detachment of the card casing at the hinge portion during a telephone call. In a detached state of the card casing 3 shown in FIG. 7, the user can make a telephone call while watching the contents displayed on the display unit, and the user can easily write a telephone number being used for the telephone call in a memory by his right hand.

Figure 8:
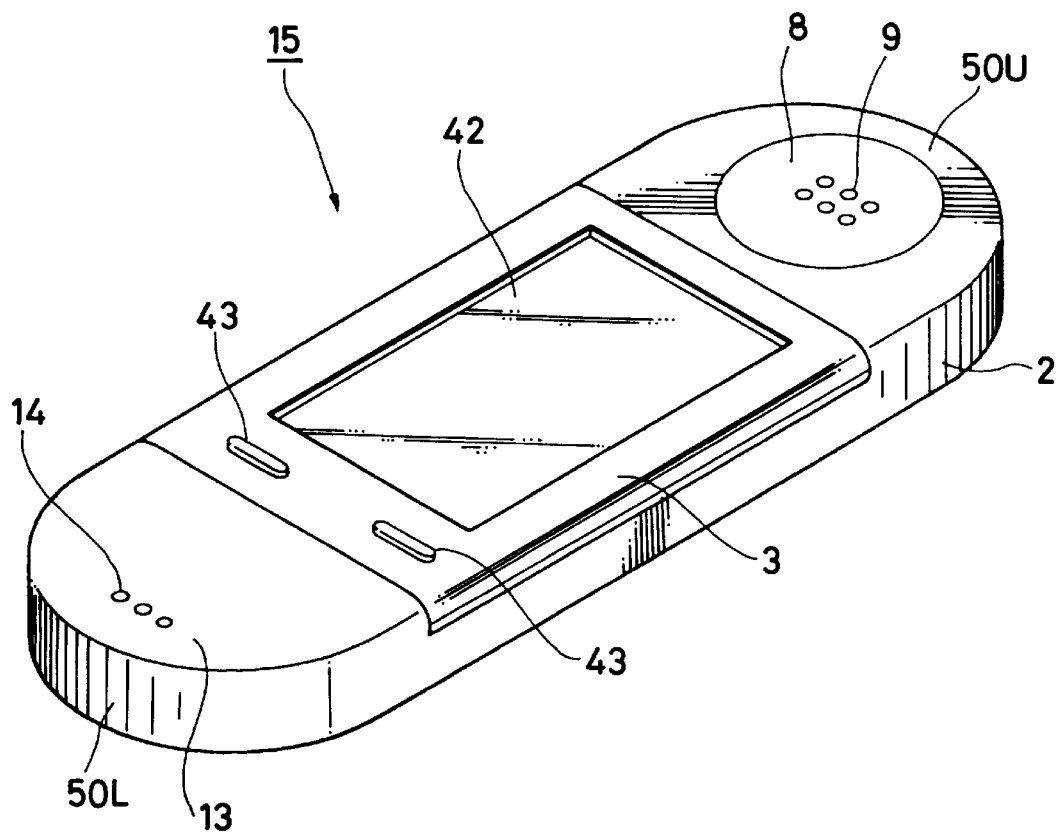
FIG. 8 is a perspective view showing a portable telephone apparatus with a card casing being housed therein according to a second embodiment of the present invention.
Figure 9:
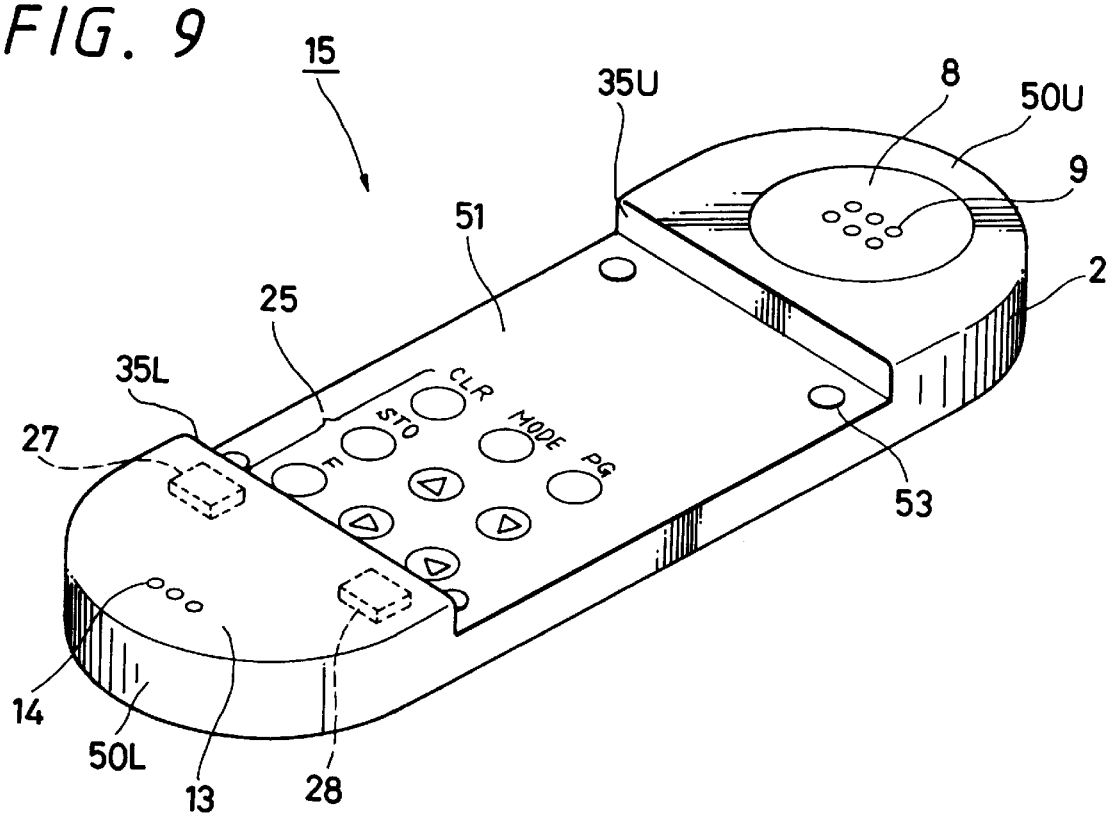
FIG. 9 is a perspective view of a body casing having another arrangement of the portable telephone apparatus according to the second embodiment.

FIGS. 8 and 9 show the portable communication terminal apparatus 15 according to the second embodiment of the present invention. In the second embodiment, a display unit 42 formed of a large-size LCD or the like is provided on the side of the cover portion 37 of the card casing 3 according to the first embodiment shown in FIG. 4. The LCD 31 provided on the panel 38 side of the card casing 3 in the first embodiment is used to display the telephone number, a calling time and so on upon a telephone call. The large-size LCD 42 of the second embodiment is used for display carried out when a text data, a data of a handwritten manuscript, a picture data and so on of an electronic mail are transmitted or received. Keys 43 provided on the card casing 3 are scroll keys used for scrolling when a message having a large number of letters is displayed on the LCD 42.

Various operations such as the setting of abbreviated dialing of the telephone number, the registration of the ID code or the like may be carried out by using the operation unit 25, described with reference to FIG. 3, provided on the panel 51 of the body casing shown in FIG. 4. In this case, the data is transmitted between the first transceiver means and the second transceiver means (i.e., between the light emitter 27 and the light detector 33 and between the light emitter 34 and the light detector 28), thereby registered data being displayed on the LCD 31 on the card casing 3 side and being stored in the memory 52.

When as shown in FIG. 8 the card casing 3 with its front side, i.e., the side of the large-size LCD 42 being faced forward is applied to the panel 51 of the body casing 2 shown in FIG. 9, data of an electronic mail can be transmitted and received. When the card casing 3 with its rear surface, i.e., the side of the panel 38 being faced forward is applied to the panel 51, audio data used for a telephone call can be transmitted and received. In this case, in order to use the LCD 42 and the panel 38 respectively provided on the front and rear sides of the card casing 3, a pair of a light emitter and a light detector are provided at each of positions where the light emitter 27 and the light detector 28 are provided in the first embodiment.

Figure 10:
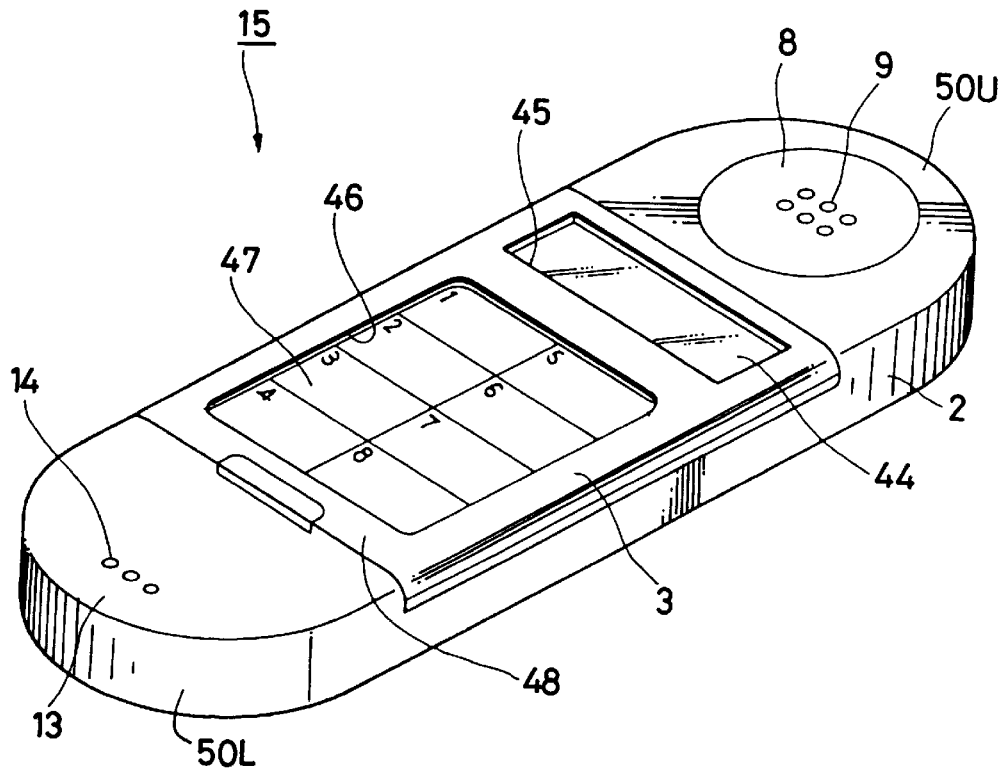
FIG. 10 is a perspective view of a portable communication terminal apparatus according to a third embodiment of the present invention.

FIG. 10 shows a portable communication terminal apparatus 15 according to the third embodiment of the present invention. FIG. 10 is a perspective view of the portable communication terminal apparatus 15 with the card casing 3 having a touch-sensitive panel 44 provided on the concave panel 51 formed with the upper and lower step portions 35U and 35L of the body casing 2 when the card casing 3 can be detachably attached to the panel 51.

As shown in FIG. 10, the card casing 3 according to the third embodiment has the touch-sensitive panel 44 instead of the large-size LCD 42 of the second embodiment shown in FIG. 9. The card casing 3 of the third embodiment has a display unit 45 on the touch-sensitive panel 44. The card casing has a frame body 48 having an aperture portion 46, into which a one-touch dialing card 47 can be inserted, on the lower side of a front surface thereof, and has the operation unit 6 formed of the ten key or the like similarly to the card casing 3 shown in FIGS. 6 to 8 on the rear surface thereof. A plural kinds of the detachable card casings 3 are prepared, which allows the user to exchange the card casings 3. For example, if the card casing 3 having the large-size LCD 42 shown in FIG. 9 is detached and then the card casing 3 having the touch-sensitive panel 44 shown in FIG. 10 is attached to the panel 51, the card casing 3 having the touch-sensitive panel 44 can be attached to and fixed on the body casing 2 by the magnets 53 in one-touch operation.

When the card casing 3 thus attached to the body casing 3 is attached to the panel 51 with its rear side being faced forward, the card casing 3 is attached to the body casing 2 as shown in FIG. 5. In order to use both the touch-sensitive panel 44 and the panel 38 respectively provided on the front and rear surfaces of the card casing 3 are used, a pair of the light emitter and the light receiver are provided at each of the positions where the light emitter 27 and the light detector 28 are provided in the first embodiment.

Since the portable communication terminal apparatus according to the present invention is arranged and operated as described above, when the user operates the portable communication terminal apparatus for registration of the telephone number or the like, it is unnecessary for the user to move the portable communication terminal apparatus from the position opposing to his mouth and ear for watching the contents displayed thereon as it is required when the portable radio telephone apparatus shown in FIGS. 1 and 2 is used. Therefore, it is possible for the user to easily input the telephone number in the portable communication terminal apparatus and watch the LCD thereof even during the telephone call.

Moreover, even when the portable communication terminal apparatus of different systems are used, if their attachment mechanisms for detachably attaching the card casings to the body casings are compatible with each other, then it is possible to obtain the portable communication terminal apparatus which allows the user to effectively utilize the data, such as his own ID (telephone) number or the like, registered or stored in the memory 52 of the card casing 3.

While in each of the first to third embodiments the light emitter and the light detector are used to transmit data between the body casing 2 and the card casing 3, data may be transmitted therebetween by providing another wireless transmission means particularly used when the card casing 3 is brought in its detached state.

While in each of the first to third embodiments the card casing 3 is detachably attached to the body casing 2, the card casing 3 may be inserted into a drawing portion of the body casing 2 from which the card casing 3 can be freely drawn.

According to the present invention, since it is unnecessary to open the card casing 3 when the information is transmitted and received and it is also unnecessary to transmit and receive the information with the card casing 3 being hung from the hinge portion or the like, it is possible to obtain a portable communication terminal apparatus whose card casing is prevented from being broken during the telephone call and which has a small and compact size. While the user puts the body casing 2 to his ear and mouth, it is possible to watch the contents displayed on the LCD of the card casing 3 and to easily input the telephone number or the like in the memory 52. Moreover, even if the portable communication terminal apparatus of a different system is used, it is possible to effectively utilize his own registered telephone number or the like.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A portable communication terminal apparatus comprising:

first means including a microphone and a speaker for performing a communication operation;

second means including a first surface and a second surface, the first surface including operation keys and display means for use in controlling said first means, and the second surface including text display means for displaying text messages received by the first means; and means for removably attaching said second means to said first means, wherein when the second means is attached to the first means one of the first surface and the second surface are faced outward from the first means, and wherein when the first means is attached to the second means data is communicated therebetween.

2. The portable communication terminal apparatus according to claim 1, wherein each of said first means and said second means has a respective light transmitting means and a respective light receiving means, whereby the data is transmitted therebetween.

3. The portable communication terminal apparatus according to claim 1, wherein said first and second means are electrically connected by wire, and wherein the data is transmitted thereby.

4. The portable communication terminal apparatus according to claim 3, wherein said second surface includes a space used for attaching an operation card for adding functions to said second means.

5. The portable communication terminal apparatus according to claim 3, wherein said first means has at least one operation key used for operations other than communication.

6. The portable communication terminal apparatus according to claim 1, wherein said means for removably attaching comprises a magnet for attaching said second means to said first means.

7. The portable communication terminal apparatus according to claim 2, wherein each of said first and second means includes respective power supply means.

8. The portable communication terminal apparatus according to claim 2, wherein when said second means is attached to said first means with said first surface thereof being faced outward from said first means, the data is transmitted from said light transmitting means of said first means corresponding to said light receiving means of said second means and from said light transmitting means of said second means corresponding to said light receiving means of said first means.

9. The portable communication terminal apparatus according to claim 1, wherein said second means includes a memory for storing identification information of a user.

10. The portable communication terminal apparatus of claim 1, wherein the second surface of said second means comprises at least one operation key for scrolling the received text message across the text display means.

11. The portable communication terminal apparatus of claim 1, wherein said text display means comprises an LCD screen.

12. The portable communication terminal apparatus of claim 10, wherein said first surface includes at least one operation key for initiating a communication operation.

* * * * *